(12) United States Patent
Dixon

(10) Patent No.: US 6,319,351 B1
(45) Date of Patent: Nov. 20, 2001

(54) ADHESIVE BONDING PROCESS FOR ALUMINIUM AND/OR ALUMINIUM ALLOY

(75) Inventor: David G Dixon, Filton (GB)

(73) Assignee: Bae Systems plc, Farnborough (GB)

( * ) Notice: Subject to any disclaimer, the term of this patent is extended or adjusted under 35 U.S.C. 154(b) by 0 days.

(21) Appl. No.: 09/445,883

(22) PCT Filed: Oct. 27, 1999

(86) PCT No.: PCT/GB99/03549

§ 371 Date: Dec. 15, 1999

§ 102(e) Date: Dec. 15, 1999

(87) PCT Pub. No.: WO00/27939

PCT Pub. Date: May 18, 2000

(30) Foreign Application Priority Data

Nov. 5, 1998 (GB) .................................. 9824223

(51) Int. Cl.$^7$ ...................................... C09J 5/04
(52) U.S. Cl. .................... 156/314; 106/287.13; 428/416
(58) Field of Search ............................ 156/314; 428/416; 106/287.13

(56) References Cited

U.S. PATENT DOCUMENTS 5,015,506 5/1991 Purcell .
5,520,768 5/1996 Crook et al. .

FOREIGN PATENT DOCUMENTS 98 30735 7/1998 (WO) .

*Primary Examiner*—John J. Gallagher
(74) *Attorney, Agent, or Firm*—Nixon & Vanderhye P.C.

(57) ABSTRACT

The durability of a bonded aluminium alloy and/or Alclad (Trade Mark) material joint can be improved by a two stage pre-treatment process in which after the surfaces to be joined have been degreased, a first solution BTESE and/or BTMSE in water, with or without methanol and/or ethanol, is applied to the degreased surfaces dried and coated with a second solution of γ-glycidoxypropyltrimethoxysilane, an amino silane, γ-aminopropyltriethoxysilane and/or trimethoxyvinylsilane in water with or without methanol and/or ethanol and drying prior to the application of an epoxy adhesive coating to the dried second solution surfaces, bonding and curing.

10 Claims, 3 Drawing Sheets

US 6,319,351 B1

ADHESIVE BONDING PROCESS FOR ALUMINIUM AND/OR ALUMINIUM ALLOY

BACKGROUND OF THE INVENTION

1. Field of the Invention

This invention relates to an adhesive bonding process for aluminium and/or aluminium alloy and particularly to a process for improving the durability of a bonded aluminium alloy and/or Alclad (Trade Mark) material joint.

2. Discussion of Prior Art

The durability of adhesive bonded joints for aluminium alloy and/or ALCLAD (Trade Mark) materials is critically dependent on the surface treatment applied to the material surfaces to be joined. Chromic acid anodising and phosphoric acid anodising are two known treatments currently in use with aluminium alloys and which confer good durability properties on the resulting joint. However, in some circumstances such as in repair work, it is not always feasible to apply chromic acid anodising or phosphoric acid anodising treatments and some other durability improving treatment is required which will have a performance approaching that of anodised and primed surfaces as made during initial manufacture.

There is thus a need for a process for improving the durability of a bonded aluminium alloy and/or ALCLAD (Trade Mark) material joint which preferably can be utilised for repair work where chromic acid anodising and phosphoric acid anodising treatments are not feasible or are environmentally toxic.

SUMMARY OF THE INVENTION

According to one aspect of the present invention there is provided a process for improving the durability of a bonded aluminium alloy and/or ALCLAD (Trade Mark) material joint, including the steps of:

degreasing surfaces of the material to be joined, applying to each degreased surface a first solution of from 0.001 to 10% by volume of 1,2-Bis(triethoxysilyl) ethane in water, with or without methanol and/or ethanol, in a range of from 0.01 to 99.9% by volume at a pH value in the range of from 3 to 7, drying the first solution coated surfaces at a temperature in the range of from 20 to 120° C. for a time in the range of from 1 to 90 minutes, applying to each dried first solution coated surface a second solution of from 0.01 to 50% by volume of γ-glycidoxypropyltrimethoxysilane, an aminosilane, γ-aminopropyltriethoxysilane, and/or trimethoxyvinylsilane in water, with or without methanol and/or ethanol, in a range of from 0.10 to 99.9% by volume at a pH value in the range of from 3 to 7, drying the second solution coated surfaces at a temperature in the range of from 20 to 120° C. for a time in the range of from 1 to 120 minutes, applying a coating of an epoxy adhesive to the dried second solution coated surfaces, contacting the epoxy adhesive coated surfaces together and curing the contacted surfaces to bond them together.

Preferably, the aluminium alloy material utilised has a composition containing, by weight 4% copper, up to 1% magnesium, up to 0.3 manganese, balance apart from impurities and incidental constituents, being aluminium, Conveniently, the degreased surfaces of the material to be joined are roughened before application of the first solution, Advantageously, the first solution is a 1% by volume aqueous solution or a 1% by volume solution of water and methanol and/or ethanol of 1,2-Bis(triethoxysilyl)ethane and/or 1,2-Bis(triemethoxysilyl)ethane at a pH value in the range of from 3 to 7, hydrolysed for a time in the range of from 10 to 25 hours, Preferably, the first solution is applied to each degreased surface by brushing, dipping, spraying or wiping and dried at substantially 60° C. for substantially 1 hour, Conveniently, the second solution is a 1% solution of γ-glycidoxypropyltrimethoxysilane in deionised water at a pH value of substantially 5, hydrolysed for 60 minutes, Alternatively, the second solution is a 1% solution of γ-glycidoxypropyltrimethoxysilane in deionised water at a pH value of substantially 4, hydrolysed for 10 minutes, Advantageously, the second solution is applied to each dried first solution coated surface by brushing and dried at substantially 60° C. for substantially one hour, Preferably, the epoxy adhesive or a hot cured adhesive curable under pressure at a temperature of at least 120° C. for a time in the range of from 1 to 2 hours, According to a further aspect of the present invention there is provided a bonded aluminium alloy and/or Alclad (Trade Mark) material joint produced by the process of the present invention.

BRIEF DESCRIPTION OF THE DRAWINGS

For a better understanding of the present invention, and to show how the same may be carried into effect, reference will now be made, by way of example, to the accompanying drawings in which.

DETAILED DISCUSSION OF PREFERRED EMBODIMENTS

Figure 1:
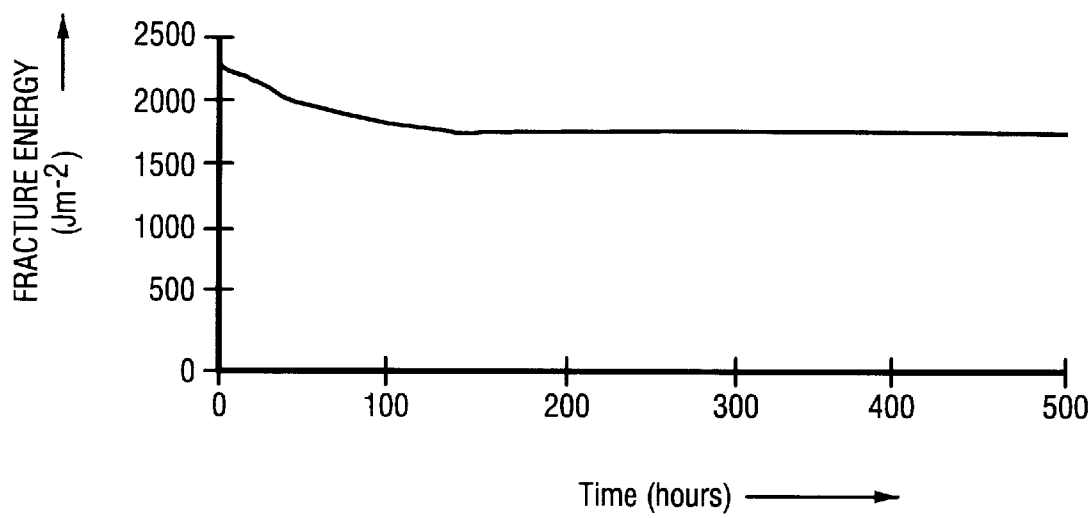
FIG. 1 is a graphical representation of fracture energy against time for a wedge cleavage test carried out on an aluminium alloy joint processed by chromic acid anodised treatment not according to the present invention.

A process according to the present invention for improving the durability of a bonded aluminium alloy and/or an aluminium alloy clad in industrially pure aluminum such as Alclad (Trade Mark) material joint is basically a two step process involving pre-treatment with a first solution of an oxysilane and a further treatment with a second solution of an organo silane. The process is suitable for use with an aluminium alloy such as alloy 2024-T3 which has a composition containing, by weight, 4% copper up to 1% magnesium, up to 0.3% manganese, with the balance, apart from impurities and incidental constituents, being aluminium. The process is also suitable for use with Alclad (Trade Mark) which is Type 2024-T3 aluminium alloy having its outer surfaces clad with pure aluminium.

In the process of the present invention surfaces of the aluminium alloy and/or Alclad (Trade Mark) material to be joined are degreased in any convenient manner such as by use of solvents and detergents either in liquid or vapour form. Preferably each degreased surface is then roughened in any convenient manner such as by grit blasting, preferably using 50 micron aluminium oxide grit or by any other abrasion means such as abrasive pads. Each degreased, and optionally roughened, surface then has applied to it a first solution of from 0.001 to 10% by volume of 1,2-Bis (triethoxysilyl)ethane (BTESE) and/or 1,2-Bis (trimethoxysilyl)ethane (BTMSE) in water, with or without methanol and/or ethanol, in a range of from 0.01 to 99.9% by volume at a pH value in the range of from 3 to 7. Preferably the first solution is a 1% by volume aqueous solution or a 1% by volume solution of water and methanol and/or ethanol of BTESE and/or BTMSE at a pH value in the range of from 4 to 5, hydrolysed for a time in the range of from 10 to 25 hours. The first solution is applied to each degreased surface by brushing, dipping, spraying or wiping and dried at substantially 60° C. for substantially on hour.

In the process of the present invention the first solution coated surfaces are dried at a temperature in the range of from 20 to 120° C. for a time in the range of from 1 to 90 minutes.

Then a second solution is applied to each dried first solution coated surface which second solution is of from 0.01 to 50% by volume of γ-glycidoxypropyltrimethoxysilane (γ-GPS) of which A-187 produced by Silquest (Registered Trade Mark) is a suitable type, an aminosilane, γ-aminopropyltriethoxysilane, and/or trimethoxyvinylsilane in water, with or without methanol and/or ethanol, in a range of from 0.10 to 99.9% by volume at a pH value in the range of from 3 to 7. Preferably the second solution is a 1% solution of γ-GPS in deionised water at a pH value of substantially 5, hydrolysed for 60 minutes. However, alternatively the second solution may be a 1% solution of γ-GPS in deoxidised water at a pH value of substantially 4, hydrolysed for 10 minutes.

The second solution is applied to each dried first solution coated surface in any convenient manner such as by brushing and dried at substantially 60° C. for substantially 1 hour. The second solution coated surfaces are then dried at a temperature in the range of from 20 to 120° C. for a time in the range of from 1 to 120 minutes. A coating of an epoxy adhesive is then applied to the dried second solution coated surfaces in any convenient manner. The epoxy adhesive utilised preferably is a room temperature curable adhesive or a hot cured adhesive curable under pressure at a temperature of at least 120° C. (more typically at 177° C.) for a time in the range of from 1 to 2 hours. A suitable epoxy adhesive is FM73 (registered Trade Mark) epoxy adhesive manufactured by Cytec Fibrerite. The epoxy adhesive coated surfaces are then contacted together and cured to bond them together. This can be done in any convenient manner, temperature and pressure as is necessary depending upon the type of epoxy adhesive utilised.

The effect of the process of the present invention on the durability of a bonded joint was tested using samples of an aluminium alloy 2024-T3 measuring 25 mm×150 mm×3.2 mm. As a control test a 1% solution by volume are γ-GPS in deionised water at a pH value of 5 was allowed to hydrolyse for 60 minutes before brushing onto grit blasted surfaces of the test samples for 10 minutes. The test samples were then dried at 93% for one hour and bonded with FM73 (registered trade mark) epoxy adhesive. For convenience the γ-GPS will also be referred to under the trade term of A-187.

BTESE and BTMSE first solutions were made up as 1% by volume aqueous solutions or as 1% solutions of water and methanol or water and ethanol at either pH value of 4 or pH value of 5, applied by brushing to the degreased and grit blasted sample surfaces. The samples were then dried at 60° C. for one hour before brushing on the second solution in the form of a 1% aqueous solution of A-187 which was then dried at 60° C. for one hour. A coating of FM73(registered trade mark) epoxy adhesive was then applied to the dried second solution coated surfaces and the epoxy adhesive coated surfaces were contacted together, cured and bonded in a hot press. In some instances, for comparison purposes, the A-187 was mixed with the BTESE or BTMSE solution before application in a process not according to the present invention.

TABLE 1

| specimen number | solutions | pH and hydrolysis time | application | drying |
|---|---|---|---|---|
| 3 | BTESE 1% in deionised water + | pH5; 18 h | brush 5 min | 60° C.; 60 min |
|   | A-187 nom (1% aqueous) | pH5; 1 h | brush 10 min | 93° C.; 60 min |
| 4 | BTESE:water:methanol - 1:1:6 + | pH5; 18 h | brush 1 min | 60° C.; 60 min |
|   | A-187 nom (1% aqueous:methanol = 1:3) | pH5; 1 h | brush 10 min | 93° C.; 60 min |
| 5 | BTESE:water:methanol = 1:10:6 + | pH5; 18 h | brush 1 min | 60° C.; 60 min |
|   | A-187 nom (1% aqueous:methanol = 1:1) | pH5; 1 h | brush 10 min | 93° C.; 60 min |
| 1 | BTESE:water:methanol = 1:1:6 | pH5; 18 h | brush 1 min | 60° C.; 60 min |
| 6 | BTESE 1% in deionised water + | pH5; 25 h | brush 5 min | 60° C.; 60 min |
|   | A-187 nom (1% aqueous) | pH5; 1 h | brush 10 min | 60° C.; 60 min |
| 7 | BTESE 1% in deionised water + | pH5; 25 h | brush 5 min | 93° C.; 60 min |
|   | A-187 nom (1% aqueous) | pH5; 1 h | brush 10 min | 93° C.; 60 min |
| 8 | BTESE 1% in deionised water + | pH5; 12 h | brush 5 min | 60° C.; 60 min |
|   | A-187 nom (1% aqueous) | pH5; 1 h | brush 10 min | 93° C.; 60 min |
| 9 | BTESE 1% in deionised water + | pH5; 12 h | brush 5 min | 60° C.; 60 min |
|   | A-187 nom (1% aqueous) | pH5; 1 h | brush 10 min | 60° C.; 60 min |

TABLE 1-continued

| specimen number | solutions | pH and hydrolysis time | application | drying |
|---|---|---|---|---|
| 2 | BTESE 1% in deionised water + 1% A-187 added after 24 h | pH5; 25 h pH5; 1 h | brush 10 min | 60° C.; 60 min |
| 10 | BTESE 1% in deionised water + A-187 (1% aqueous) | pH5; 18 h pH5; 1 h | brush 5 min brush 10 min | 60° C.; 60 min 60° C.; 60 min |
| 11 | BTMSE 1% in deionised water + A-187 (1% aqueous) | pH5; 18 h pH5; 1 h | brush 5 min brush 10 min | 60° C.; 60 min 60° C.; 60 min |
| 12 | BTMSE 1% in water; ethanol = 4:6 + A-187 (1% aqueous) | pH5; 18 h pH5; 1 h | brush 5 min brush 10 min | 60° C.; 60 min 60° C.; 60 min |
| 13 | BTMSE 1% in water, ethanol = 4:6 + A-187 (1% aqueous) | pH4; 1 hr pH5; 1 hr | brush 5 min brush 10 min | 60° C.; 60 min 60° C.; 60 min |
| 14 | BTMSE 1% in water, ethanol = 4:6 + A-187 (1% aqueous) added after 17 hrs | pH5; 18 h 1 hr | brush 10 min | 60° C.; 60 min |

Five test samples were made for each variable parameter and each sample was prepared and bonded in batches of 5 or 10 as individual specimens rather than machined from bonded sheets. Each sample was machined to remove excess adhesive from the edges and polished with 1,200 grit SiC paper.

The bonded samples prepared in this way were tested for wedge cleavage resistance by first inserting the wedge in the bonded joint, the wedge being a 3.2 mm wedge of aluminium, then resting the sample for 1 hour in ambient laboratory conditions followed by measuring the initial crack length of the bond breakdown, followed by exposure of the sample at 50° C. and at 96% relative humidity with subsequent measurement of the crack length at appropriate timed intervals.

For comparison purposes the results from a series of control samples are given which include chromic acid anodised samples and samples with no surface treatment other than degreasing and grit blasting. The results are shown in the accompanying FIGS. 1 to 6.

The wedge cleavage test results using FM-73 adhesive are shown plotted for fracture energy $G_{ic}$ vs. time (in hours)

$$G_{Ic} = \frac{Ed^2h^3}{16} \frac{(3(a+0.6h)^2 + h^2)}{((a+o.6h)^3 + ah)^2} \quad (1)$$

where h=adhered thickness a=crack length d=displacement due to wedge

E=Young's modulus

A major improvement in durability has been achieved by using A-187 plus BTESE and/or BTMSE. Typically, the crack growth rate has been reduced to less than half the value achieved with the best results using A-187 alone. Whilst all the variants of BTESE plus A-187 and BTMSE plus A-187 are better, certain combinations are superior. For both BTESE and BTMSE, the two-step applications using just aqueous solutions are more durable than the processes which use water and methanol or water and methanol. This may be because the silanes do not dissolve readily in water and also because mixtures of water and ethanol or methanol appear to wet the aluminium surface better. However, purely aqueous solutions will wet the aluminium substrates if they have been abraded or grit-blasted. All the silanes need to hydrolyse in water before use and it is well-known that the rate of hydrolysis is critically-dependent on the solution pH. All the BTESE specimens were hydrolysed at pH 5 but those hydrolysed for 18 hours performed slightly better than those hydrolysed for 25 h or 12 h. A comparison between specimens with two different drying temperatures showed that those dried at 60° C. performed better than those where the A-187 was dried at 93° C. This effect is also seen when A-187 is used alone.

A two step application of the process of the present invention is better than mixing A-187 with BTESE and mixing A-187 with BTMSE. The reasons for this may be that the initial application allows the BTESE and BTMSE to form continuous layers which act as "crosslinkers" forming good bonds with the (probably hydrated) aluminium oxide. A subsequent application of A-187 may then form on top of the first layer, allowing bonds to be formed with the adhesive. Since the BTESE and BTMSE have six silanol groups after hyroxyl groups on the metal oxide. This bonding is likely to be via oxirane (Al—O—Si) groups or via hydrogen bonding (A1-OH . . . HO—Si).

There was poor durability when BTESE was used alone; this may be because there were no epoxide end-groups (as in the A-187) available to bond to the adhesive. Rinsing in water after application can be used to reduce the thickness of the silane layer before drying but in earlier work with A-187 this was found to reduce the performance significantly. Testing has been extended to over 2000 hours in some cases and it is interesting to note that whilst the relative rankings change slightly with time, an initial estimate of performance based on measurements after 24 hours gives a fair representation of the performance at 2000 hours.

Figure 2:
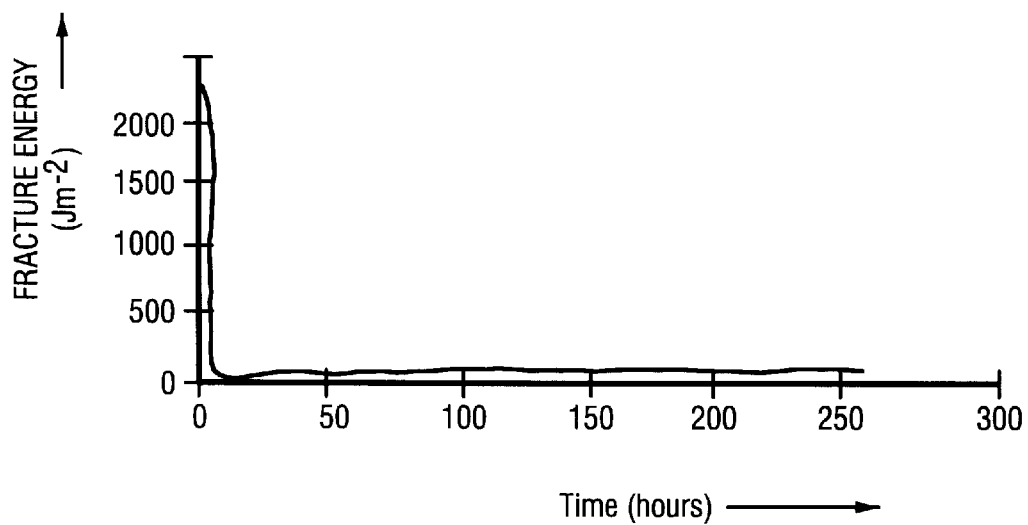
FIG. 2 is a graphical representation of fracture energy against time for a wedge cleavage test carried out on a bonded aluminium alloy joint processed by degreasing and grit blasting prior to epoxy resin bonding, not according to the present invention.

FIG. 1 shows the results not according to the invention for type 2024-T3 Alclad samples chromic acid anodized. In FIG. 2 the same samples were degreased and grit blasted only prior to bonding and are not made by the process of the present invention. A considerable drop in fracture energy almost immediately in time on testing was observed which contrasts strongly with the good fracture energy results shown in FIG. 1 for the chromic acid anodised treatment.

Figure 3:
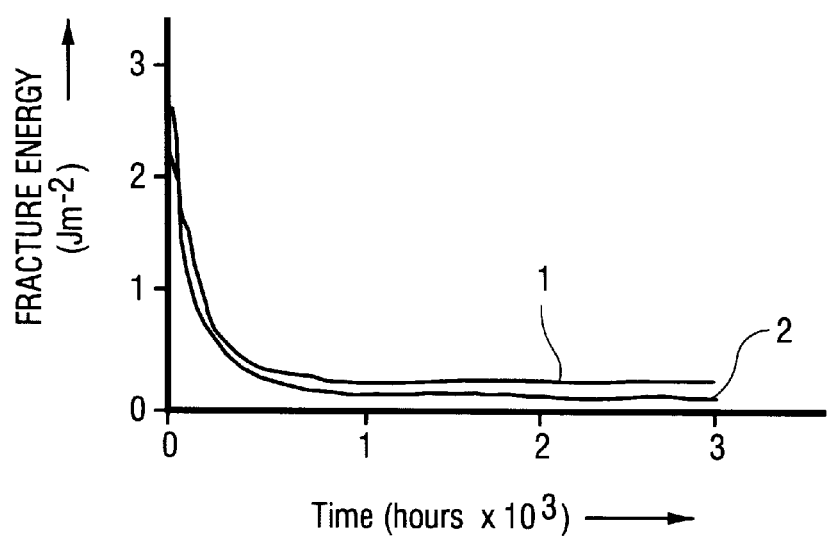
FIG. 3 is a graphical representation of fracture energy against time for wedge cleavage tests carried out on bonded aluminium alloy joints prepared by pre-treatment with γ-glycidoxypropyltrimethoxysilane not according to the present invention.

FIG. 3 shows the use of A-187 only, not according to the invention, prior to bonding and once again there is little resistance to fracture under test in a very short time. In FIG. 3 line 1 represents samples dried at 60° C. and line 2 represents samples dried at 93° C.

Figure 4:
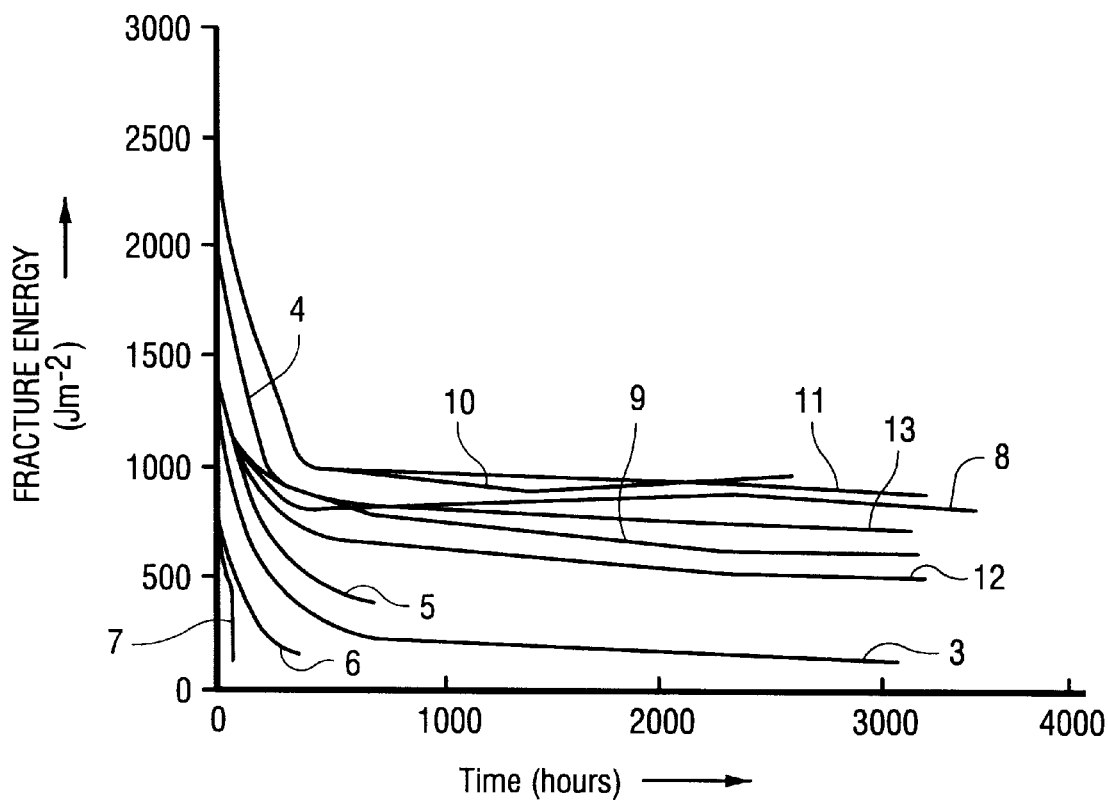
FIG. 4 is a graphical representation of fracture energy against time for wedge cleavage tests carried out using a 1,2-Bis(triethoxtsilyl)ethane and γ-glycidoxypropyltrimethoxysilane according to the process of the present invention.

FIG. 4 shows various results for treatments according to the present invention utilising a first solution of BTESE and a comparison not according to the invention utilising A-187 only. The result for the latter use of A-187 only is shown at line 3 in FIG. 4. Line 4 shows the results for specimen no. 3 in Table 1, line 5 shows the results for sample 4 in Table 1, line 6 shows the results for specimen 5 in Table 1 and line 7 shows the results for specimen 1 in Table 1. Specimen 1 was prepared not according to the present invention. Line 8 shows the results for specimen 6 in Table 1, line 9 shows the results for specimen 7 in Table 1, line 10 shows the results for specimen 8 in Table 1, line 11 shows the results for specimen 9, line 12 shows the results for specimen 2 in Table 1, and line 13 shows the results for specimen 10 in Table 1.

Figure 5:
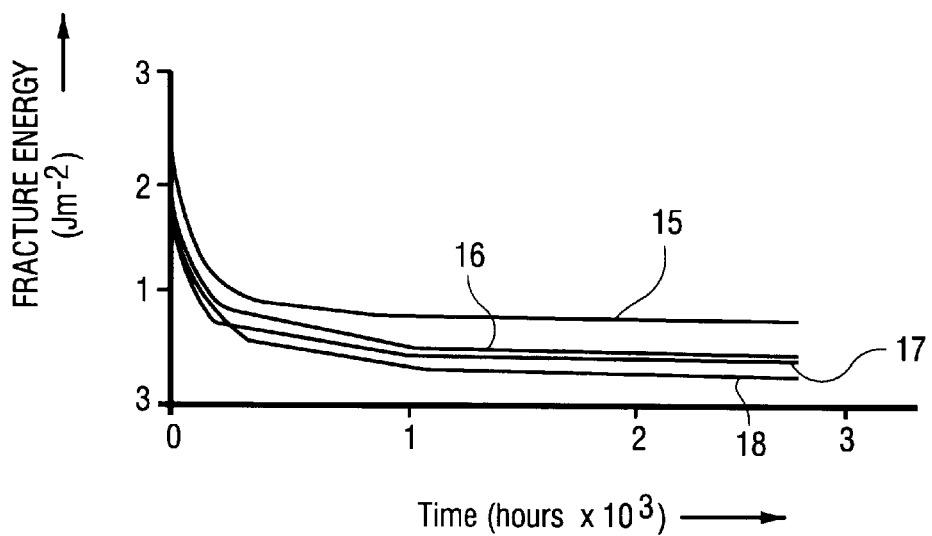
FIG. 5 is a graphical representation of fracture energy against time for wedge cleavage tests carried out on bonded aluminium alloy joints prepared according to the present invention using 1,2-Bis(trimethoxysilyl)ethane and γ-glycidoxypropyltrimethoxysilane according to the present invention and, FIG. 6 is a graphical representation of fracture energy against time for wedge cleavage tests carried out on bonded aluminium alloy joints prepared according to a process of the present invention illustrating selected results from FIGS. 4 and 5 in comparison with FIG. 3.

In FIG. 5 wedge cleavage test results on specimens according to the present invention are illustrated using BTMSE and A-187 together with specimen 14 not according to the present invention. In FIG. 5 line 15 shows the results for specimen 11 in Table 1, line 16 shows the results for specimen 12 in Table 1, line 17 shows the results for specimen 13 in Table 1, and line 18 shows the results for specimen 14 in Table 1.

Figure 6:
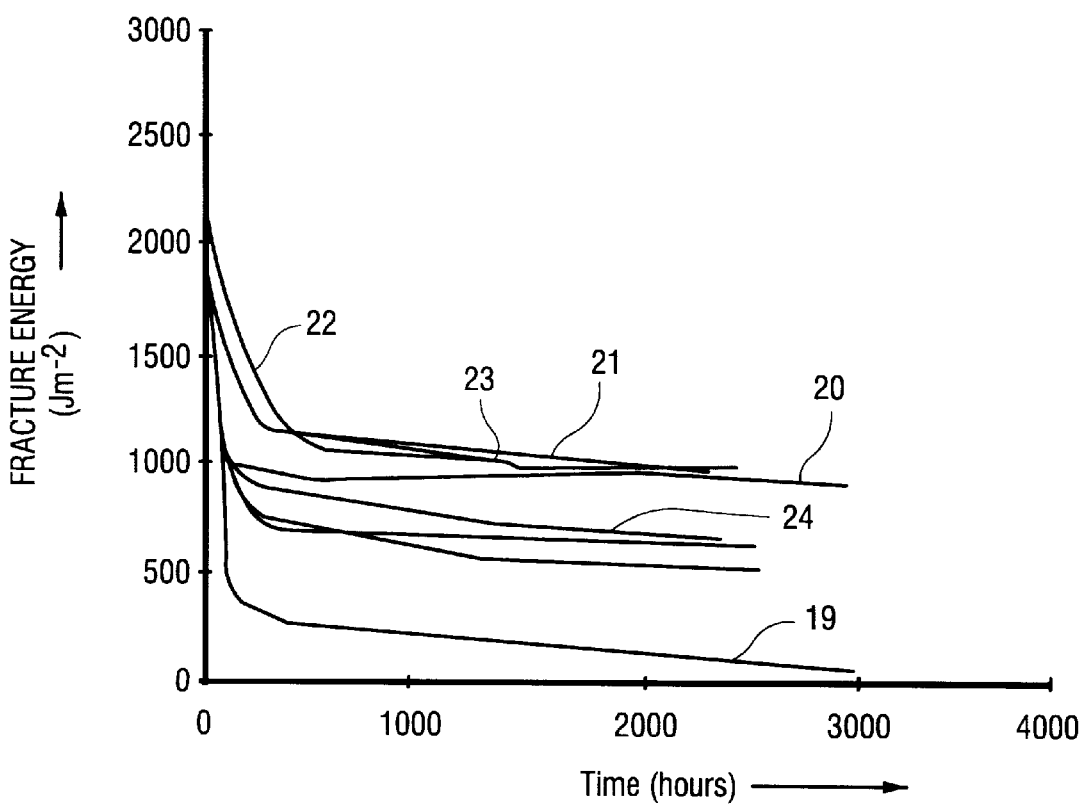

FIG. 6 is a comparison of wedge cleavage test results using the process of the present invention in which the first solution is of BTESE or of BTMSE in comparison with line 19 which shows the results not according to the invention for simple use of A-187 as shown in FIG. 3. Line 20 shows the results for specimen 6 in Table 1. Line 21 shows the results for specimen 9 in Table 1, and line 22 shows the results for specimen 10 in Table 1. Line 23 shows the results for specimen 11 in Table 1 and line 24 shows the results for specimen12 in Table 1.

Thus FIG. 6, in particular, shows that the process of the present invention produced wedge cleavage results which show a considerable improvement over the use of A-187 Silane on its own (see FIG. 3) and approaching that of the chromic acid anodised results shown in FIG. 1. In particular specimens 6, 9 and 10 which utilise BTESE and specimens 11 and 12 which utilise BTMSE showed fracture energy results over 3,000 hours of around about 1,000 Jm$^{-2}$ whereas chromic acid anodised pre-treatment only, showed a fracture energy requirement over 500 hours of approximately 2,000 Jm$^{-2}$ in contrast with the fracture energy of approximately 250 Jm$^{-2}$ over 3,000 hours for A-187 silane only treated samples. Hence BTESE and BTMSE silanes when used in conjunction with A-187 typically reduced the crack growth rate to less than half the value achieved with the best results using A-187 alone.

What is claimed is:

1. A process for improving the durability of a bonded aluminium alloy and/or aluminium alloy clad in industrially pure aluminium material joint, including the steps of:

degreasing surfaces of the material to be joined, applying to each degreased surface a first solution of from 0.001 to 10% by volume of 1,2-Bis(triethoxysilyl) ethane in water, with or without methanol and/or ethanol, in a range of from 0.01 to 99.9% by volume at a pH value in the range of from 3 to 7, drying the first solution coated surfaces at a temperature in the range of from 20 to 120° C. for a time in the range of from 1 to 90 minutes, applying to each dried first solution coated surface a second solution of from 0.01 to 50% by volume of γ-Glycidoxypropyltrimethoxysilane, an aminosilane, γ-aminopropyltriethoxysilane, and/or trimethoxyvinylsilane in water, with or without methanol and/or ethanol, in a range of from 0.10 to 99.9% by volume at a pH value in the range of from 3 to 7, drying the second solution coated surfaces at a temperature in the range of from 20 to 120° C. for a time in the range of from 1 to 120 minutes, applying a coating of an epoxy adhesive to the dried second solution coated surfaces, contacting the epoxy adhesive coated surfaces together and curing the contacted surfaces to bond them together.

2. A process according to claim 1, in which the aluminium alloy material utilised has a composition containing, by weight 4% copper up to 1% magnesium, up to 0.3% manganese, balance apart from impurities and incidental constituents, being aluminium.

3. A process according to claim 1, in which the degreased surfaces of the material to be joined are roughened before application of the first solution.

4. A process according to claim 1, in which the first solution is a 1% by volume aqueous solution or a 1% by volume solution of water and methanol and/or ethanol of 1,2-Bis(triethoxysilyl) ethane and/or 1,2-Bis (triemethoxysilyl) ethane at a pH value in the range of from 3 to 7, hydrolysed for a time in the range of from 10 to 25 hours.

5. A process according to claim 4, in which the first solution is applied to each degreased surface by brushing, dipping, spraying or wiping and dried at substantially 60° C. for substantially 1 hour.

6. A process according to claim 1, in which the second solution is a 1% solution of γ-glycidoxypropyltrimethoxysilane in deionised water at a pH value of substantially 5, hydrolysed for 60 minutes.

7. A process according to claim 1, in which the second solution is a 1% solution of y-glycidoxypropyltrimethoxysilane in deionised water at a pH value of substantially 4, hydrolysed for 10 minutes.

8. A process according to claim 6, in which the second solution is applied to each dried first solution coated surface by brushing and dried at substantially 60° C. for substantially one hour.

9. A process according to claim 1 in which the epoxy adhesive or a hot cured adhesive curable under pressure at a temperature of at least 120° C. for a time in the range of from 1 to 2 hours.

10. A bonded aluminium alloy and/or aluminium alloy clad in industrially pure aluminium material joint, produced by the process of claim 1.

* * * * *